United States Patent [19]
Patchel

[11] Patent Number: 4,776,209
[45] Date of Patent: Oct. 11, 1988

[54] LEAKAGE DETECTOR

[75] Inventor: Kenneth A. Patchel, Kennett Square, Pa.

[73] Assignee: W. L. Gore & Associates, Inc., Newark, Del.

[21] Appl. No.: 72,472

[22] Filed: Jul. 13, 1987

[51] Int. Cl.⁴ .......... G01M 3/06
[52] U.S. Cl. .......... 73/45.5
[58] Field of Search .......... 73/45.5, 41.2, 40

[56] References Cited

U.S. PATENT DOCUMENTS

| | | | |
|---|---|---|---|
| 2,054,204 | 9/1936 | McDonald | 73/45.5 |
| 2,543,911 | 3/1951 | Isaacs | 73/40 |
| 3,166,439 | 1/1965 | Dennhofer | 118/9 |
| 3,577,770 | 5/1971 | Shaw | 73/49.8 |
| 3,581,101 | 5/1971 | Neeff | 250/218 |
| 3,622,427 | 11/1971 | Kelly | 161/42 |
| 4,236,949 | 12/1980 | Horsma et al. | 156/49 |
| 4,306,448 | 12/1981 | Rohde | 73/52 |
| 4,419,883 | 12/1983 | Gelston, II | 73/45.5 X |

FOREIGN PATENT DOCUMENTS

| | | | |
|---|---|---|---|
| 1908155 | 9/1970 | Fed. Rep. of Germany | 73/45.5 |

*Primary Examiner*—Stewart J. Levy
*Assistant Examiner*—Joseph W. Roskos

[57] ABSTRACT

An apparatus and method for testing for gas leaks in waterproof gloves and glove inserts by applying gas under controlled pressure into a confined glove or insert and measuring bubbling or lack thereof in a suitable reservoir of liquid. The glove is not wet by liquid.

15 Claims, 2 Drawing Sheets

4
19
3
1
11
18
10
5
9
6
6
8
5
6
6
12
16
15
13
14
20
17

LEAKAGE DETECTOR

FIELD OF THE INVENTION

This invention relates to an apparatus for testing and a method for testing waterproofness of gloves or glove inserts.

BACKGROUND OF THE INVENTION

Gloves can be made completely of waterproof material or can be rendered waterproof by the use of glove inserts made from waterproof materials placed within glove outer shells to render the combination waterproof. Waterproof gloves have become popular for use in outdoor sports and activities or for working in the outdoors under cold and wet conditions to maintain dry, warm, and comfortable hands. Truly waterproof qualities under quite severe conditions of weather extremes and usage are much sought after.

To insure that the glove or insert is really completely waterproof, the manufacturer usually tests for leaks. Such testing usually involves immersing the glove in a liquid, such as water. This test method, however, leaves a wet glove which must be dried before packing and shipping even if it is found to be totally waterproof. Such methods and the accompanying apparatus thus tend to be slow and not be very economical even when used en mass in batteries of testers.

To overcome some of the problems generally associated with wet testing, dry methods have been tried, such as the device for powdering and pinhole leak testing rubber surgeons gloves described by Isaacs in U.S. Pat. No. 2,543,911. A hollow elastic body to hold powder and to hold in place a surgeons glove was pressed to blow powder into the glove being tested and at the same time expand the glove under pressure to reveal any pinhole air leaks which could be visually observed. U.S. Pat. No. 4,306,448 to Rohde showed a means to close a container with a resilient plug, raise the gas pressure within the container, and measure any pressure decline associated with a leak by a pressure guage.

These methods work satisfactorily for rigid containers conveniently closed by resilient plugs or for very flexible materials, such as thin rubber gloves, when a hole will become large enough under pressure to be readily detectable and the product is cheap enough to be discarded if found to be leaky. They have, however, limited application for a wide variety of the gloves in the market place.

SUMMARY OF THE INVENTION

This invention provides an apparatus and a method for testing waterproof gloves and waterproof inserts for gloves for waterproofness by means of testing them for leaks. The apparatus comprises a vertical cylindrical tube having a beveled top edge with a raised bulkhead closing the bottom end, a conical solid plug to fit the top of the tube, a valved supply of compressed gas supplied to the plug for raising the gas pressure within the article to be tested within the tube, a gas exit tube affixed to an opening in the bulkhead in the bottom of the cylindrical tube, and a conveniently sized container in which the cylindrical tube sits in sufficient liquid to cover the end of the gas exit tube. The testing process of the invention comprises placing a glove or waterproof insert to be tested within the cylindrical tube, sealing the open end of the glove/insert between the beveled edge of the tube and the solid plug, and admitting gas to completely fill the glove/insert. Bubbling will occur from the tube exit as the glove expands. When bubbling stops and remains stopped the glove/insert has no leak or is waterproof; if bubbling continues, a leak is present in the glove/insert and it is rejected.

DESCRIPTION OF THE PREFERRED EMBODIMENTS

The apparatus of the invention and the process for testing a waterproof glove or waterproof glove insert for gas leakage utilizing that apparatus will now be described with reference to the drawings.

Figure 1:
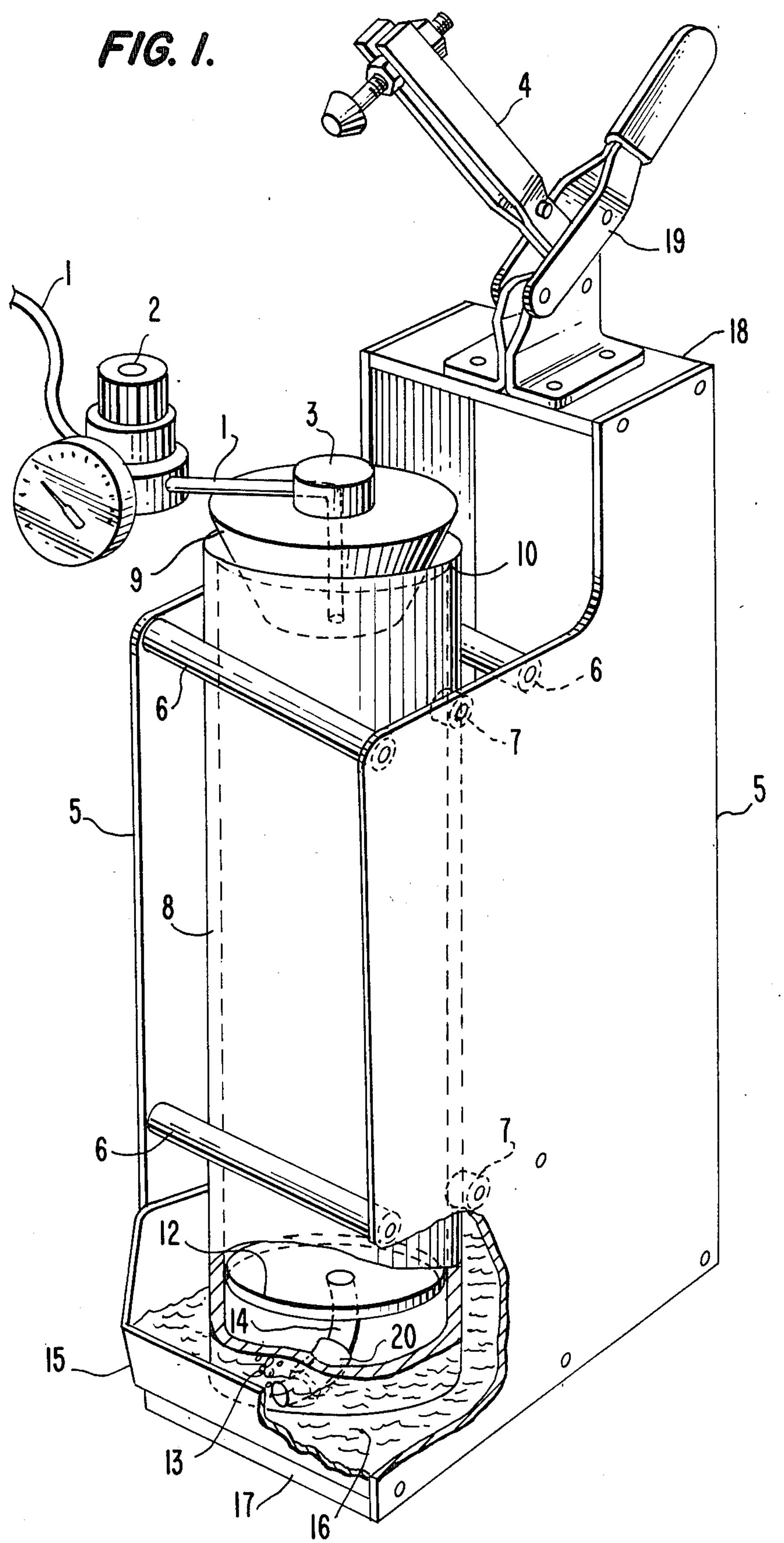
FIG. 1 shows a perspective view of the apparatus of the invention containing liquid for immersion of the outer end of the gas exit tube.
Figure 2:
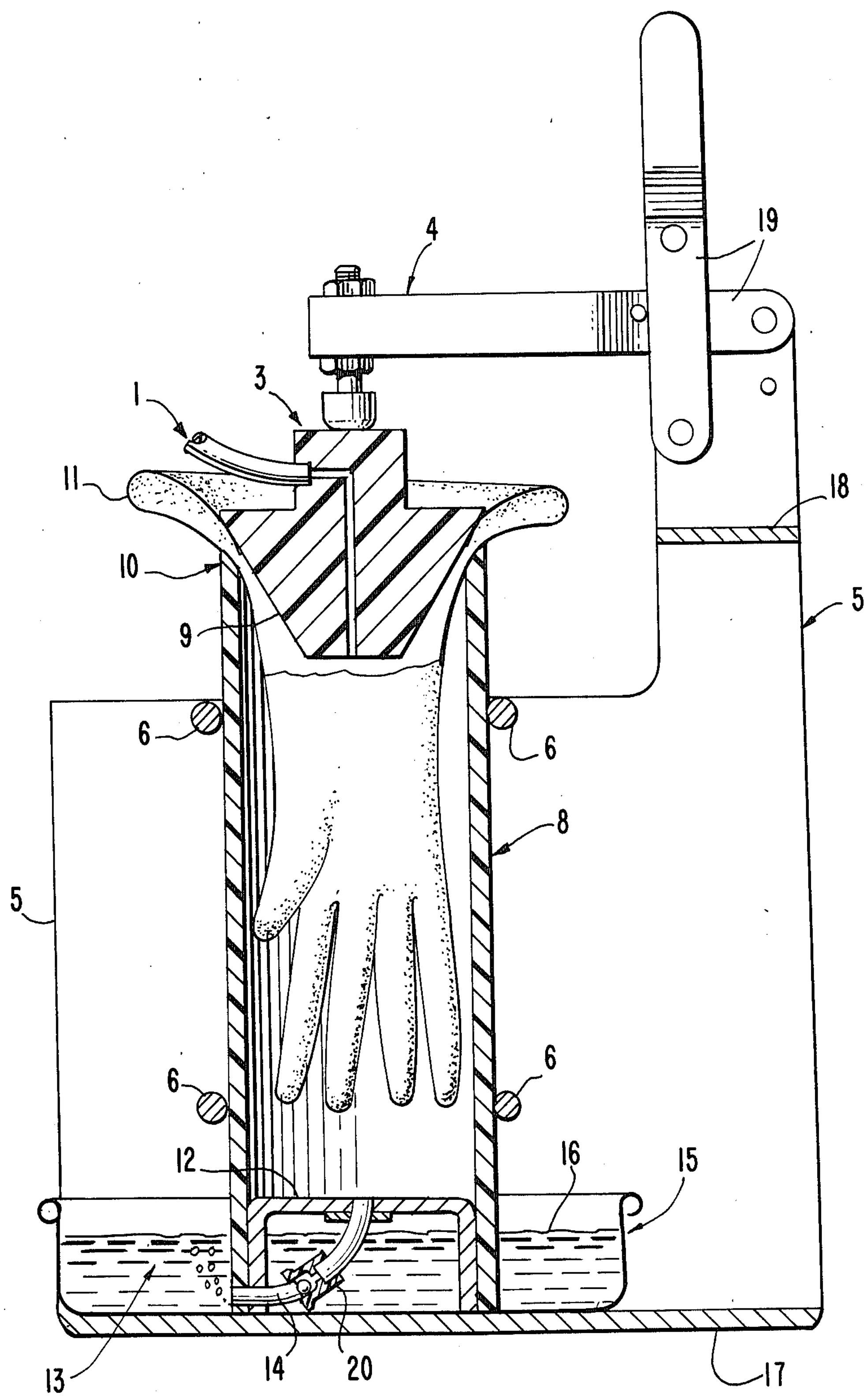
FIG. 2 is a cross-section of the apparatus of the invention in closed position while it is holding a glove or insert in position to measure any gas leakage it may have.

The testing apparatus comprises a cylindrical tube 8, a tapered conical plug 3, an exit tube 14 for gas, a container 15 for holding a liquid 16, a clamping mechanism 19 for applying pressure to plug 8, a support stand, having side plates 5, bottom support plate 17, and top support bar 18 for mounting clamping mechanism 19, tube 8, plug 3, and container 15, and positioning and support means, including bars 6 and buttons 7, for tube 8. Cylindrical tube 8 may conveniently be made from plastic, such as from a section of plastic pipe, but may be of metal or other materials in tubular form and has a beveled top edge 10 for conforming with or fitting against a solid tapered conical plug 3. Plug 3 is usually of plastic but may be formed from other suitable materials and it fits closely the bevel of tube 8 to hold tightly a glove 11 (or glove insert), as shown in FIG. 2, between it and plug 3 under pressure applied by arm 4 of clamping mechanism 19 so as to retain gas pressure developed within the glove (or glove insert) by gas forced in under pressure through gas inlet tube 1 which passes through plug 3 into the glove. The gas is usually and conveniently air which is supplied at valve controlled pressure, usually two to five pounds per square inch gauge. Air can be supplied by pressure cylinder, mechanical or electrical pump, or by hand pump, or any other convenient means known in the art. FIG. 1 shows a valved mechanism 2 with pressure gauge attached to gas inlet tube 1 to control the pressure of gas entering glove 11 in tube 8. Bevel 10 and the conical side of plug 3 act together to pinch glove 11 tightly enough to maintain a positive pressure within glove 11.

Gas exit tube 14 is affixed to an aperture in a bulkhead 12 which is sealed into the bottom of tube 8 to seal out liquid 16 from tube 8 so that the liquid 16, usually and conveniently water, will not enter tube 8 and wet a glove 11 or insert under test. Bulkhead 12 may also be plastic, often the same plastic as tube 8. Gas exit tube 14 passes through a notch or an aperture in or near the bottom edge of tube 8 and allows any excess gas in tube 8 to flow out or bubble out through liquid 16 in container 15 where such bubbles 13 may be observed. Check valve 20 is affixed on tube 14 between bulkhead 12 and the gas exit aperture through the wall of tube 8 to block entry of any liquid 16 in the event of development of less than atmospheric pressure within tube 8 or glove 11 during a testing procedure such as during removal of glove 11.

Container 15 may be a simple rectangular plastic tray and sufficient liquid 16, usually water, is added to maintain a level requisite for easy observation of any bubbles 13 which may be issuing from gas exit tube 14.

Clamping mechanism 19 is affixed to bar 18 such that bar 4 of the mechanism may be lowered to exert enough pressure downwardly on plug 3 so as to effect a seal at the bevels and glove or insert. Bar 18, side plates 5, and bottom support plate 17 are of metal, are usually aluminum, but may be steel or other metal, and when fastened together with positioning and support bars 6 and buttons 7, both also of the same metals, provide a sturdy support for tube 8, clamping mechanism 19, and container 15. Clamping mechanism 19, is similarly made from the same metals used above and fastened in place by standard art means.

The FIG. 2 cross-section depicts how a glove 11 under test is placed inside tube 8 and plug 3 inserted into the open end of the glove 11.

To test waterproof glove 11 (or a glove insert) for leaks, air is now admitted into glove 11 (or glove insert) through tube 1 to about 2–5 psig. Glove 11 (or glove insert) expands against the walls of the tube 8 and some bubbles are emitted. At full expansion bubbles 13 cease to emerge from tube 14 if no leak exists in glove 11 (or glove insert). If there is a leak, bubbles 13 will continue to emerge from tube 14 as will be readily observable in liquid 16 (usually water). After a few seconds observation for leaks, the gas flow into 1 is stopped, the pressure within glove 11 released, arm 4 of mechanism 19 raised, and glove 11 removed for packing for sale or rejected for leakage and return to manufacturer.

The apparatus and method of use for testing for leaks of the present invention are simple to use in the manufacturing process, in field testing, and in sales, are effective, rapid, and accurate in determining the presence of even a tiny pinhole leak if present or ruling it out if not present, and do not risk contamination of or ruining of a glove or insert by wetting it with water or other liquid during the test procedure. No significant expertise is required to operate the apparatus properly and simple non-technical training suffices.

Although the apparatus of the present invention is seen to be useful for relatively soft hollow articles, such as the waterproof gloves and glove inserts used to illustrate the inventive apparatus, other harder, firmer articles may be tested for leaks, particularly if the hard, tapered conical plug used for gloves and inserts is replaced by a more elastic or resilient plug.

It will be apparent to those skilled in the art that various modifications and changes in methods and materials could be made for making and using this invention without departing from the spirit and scope of the invention, the scope of which is delineated in the appended claims.

I claim:

1. An apparatus for testing leakage of gas through the waterproof layer of a waterproof hollow layered article comprising:

(a) a cylindrical tube for containing and confining said article, having an inwardly beveled top edge and a raised bulkhead bottom closure to isolate liquid from said tube, said bulkhead bottom closure having an aperture for passage of a gas;

(b) a solid tapered conical plug configured to conform closely to the bevel of and to close the opening of said tube and having valved means for passage of a gas through said plug;

(c) an exit tube for passage of a gas affixed to said aperture in said bulkhead bottom closure, and having a check valve;

(d) a container surrounding the bottom of said cylindrical tube containing a sufficient quantity of liquid to immerse the end of said gas exit tube in said liquid to the extent that the passage of gas bubbles from the end of said exit tube is readily observed;

(e) a clamping mechanism for raising, lowering, and applying pressure downwardly to the top of said plug;

(f) a support stand for mounting said clamping mechanism, said tube, said plug, and said container; and (g) support means to hold said tube in position in said container.

2. An apparatus of claim 1 wherein the hollow article is waterproof handwear.

3. An apparatus of claim 2 wherein the handwear is a glove.

4. An apparatus of claim 3, wherein the gas is air and the liquid is water.

5. An apparatus of claim 1 wherein the waterproof layer of a waterproof hollow article is a glove insert.

6. An apparatus of claim 5, wherein the gas is air and the liquid is water.

7. An apparatus of claim 1 wherein the gas is air and the liquid is water.

8. A process for testing for leakage of gas through the waterproof layer of a hollow article, comprising the steps of:

(a) inserting said hollow article into a cylindrical tube having an inwardly beveled top edge, a gas exit tube at the opposite end, said tube end and gas exit tube being covered by a liquid;

(b) inserting a valved tapered plug into an opening in said article and sealing said article against the bevel of the cylindrical tube;

(c) pressurizing said article in the cylindrical tube to about two to five pounds per square inch gauge gas pressure;

(d) after complete pressurization of said article, waiting five to ten seconds for bubbling to cease in the liquid covering the end of the gas exit tube;

(e) observing if bubbling at the end of the gas exit tube ceases following completion of pressurization of said article;

(f) releasing the gas pressure in said article, removing said plug, and removing said article from said cylindrical tube.

9. A process of claim 8 wherein the hollow article is handwear.

10. A process of claim 9 wherein the handwear is a glove.

11. A process of claim 8 where the waterproof layer of a hollow article is a waterproof glove insert.

12. An apparatus for testing leakage of gas comprising:

(a) a cylindrical tube for containing and confining an article being tested, having an inwardly beveled top edge and a raised bulkhead bottom closure, said closure having an aperture therein for passage of a gas;

(b) a tapered conical plug configured to conform closely to the bevel of and to close the opening of said tube, and having valved means for passage of a gas through said plug;

(c) an exit tube, including a check valve, for passage of a gas affixed to said aperture in said bottom closure;

(d) a container surrounding the bottom of said cylindrical tube and holding therein a sufficient quantity of liquid to immerse the end of said gas exit tube in said liquid to the extent that the passage of gas bubbles from the end of said exit tube is readily observed;

(e) a clamping mechanism for applying pressure downwardly to the top of said plug;

(f) a support stand for mounting said clamping mechanism, said tube, said plug, and said container; and (g) support means to hold in position said tube in said container.

13. An apparatus of claim 12 wherein said gas is air, said liquid is water, said support stand is metal, and said support means comprise metal rods and buttons affixed to said support stand in a positioning array about said cylindrical tube.

14. An apparatus of claim 13 wherein said plug is a hard solid.

15. An apparatus of claim 13 wherein said plug is an elastic or resilient solid.

* * * * *